Nov. 10, 1959  R. JOHNSON  2,911,668
METHOD FOR CLEANING FISH
Filed Nov. 19, 1956  2 Sheets-Sheet 1
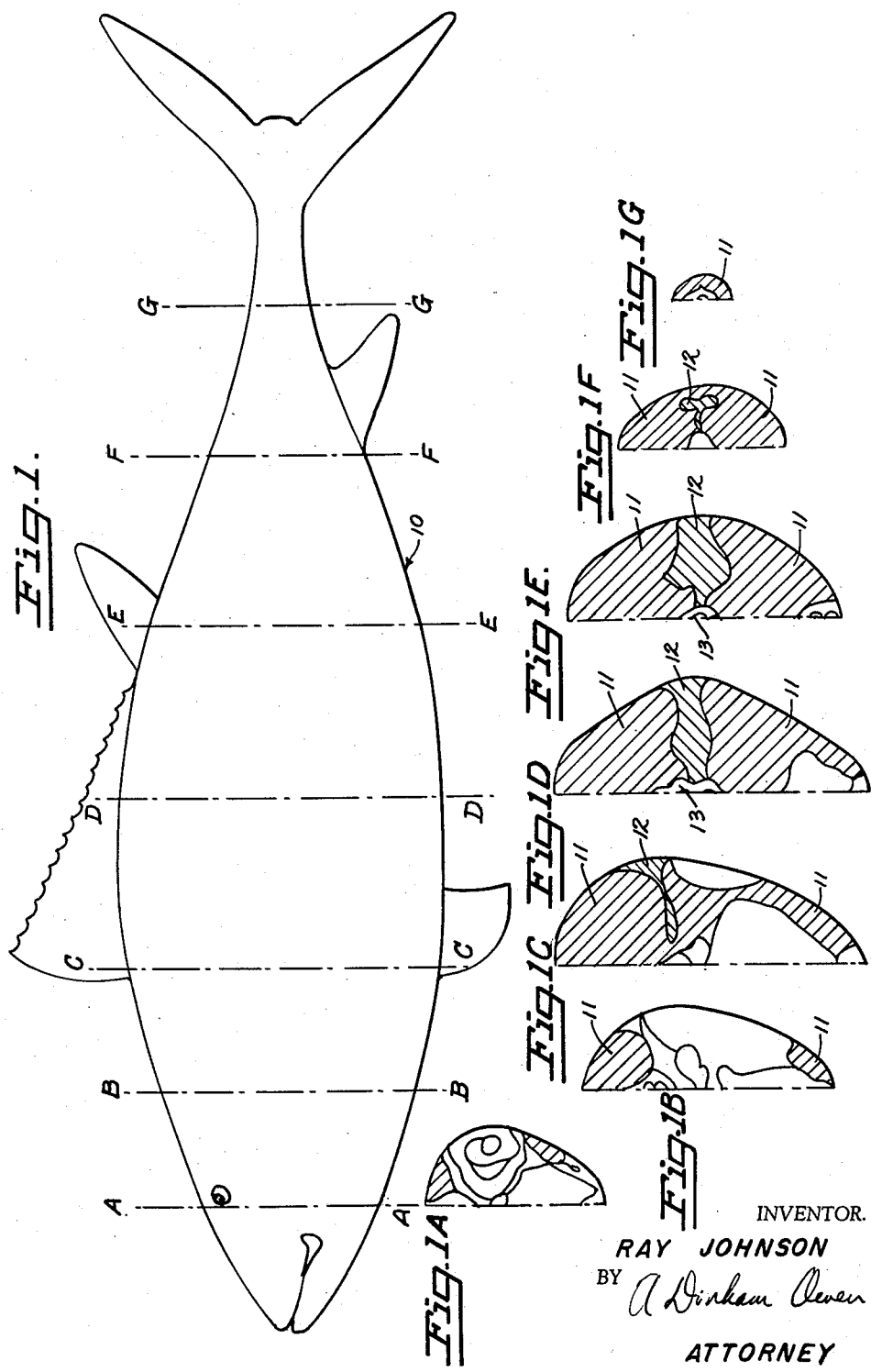
INVENTOR.
RAY JOHNSON
BY
ATTORNEY Nov. 10, 1959    R. JOHNSON    2,911,668
METHOD FOR CLEANING FISH
Filed Nov. 19, 1956    2 Sheets-Sheet 2
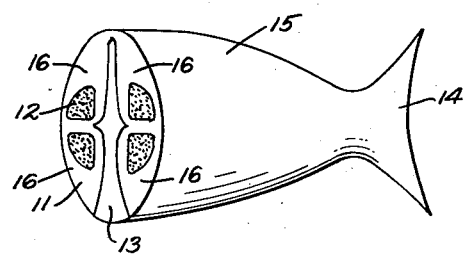
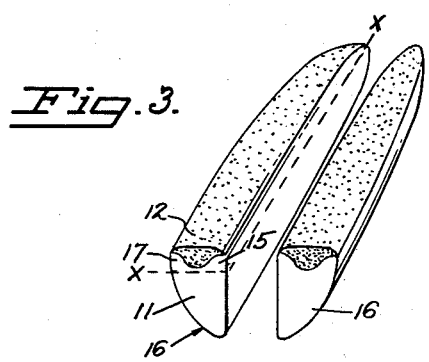
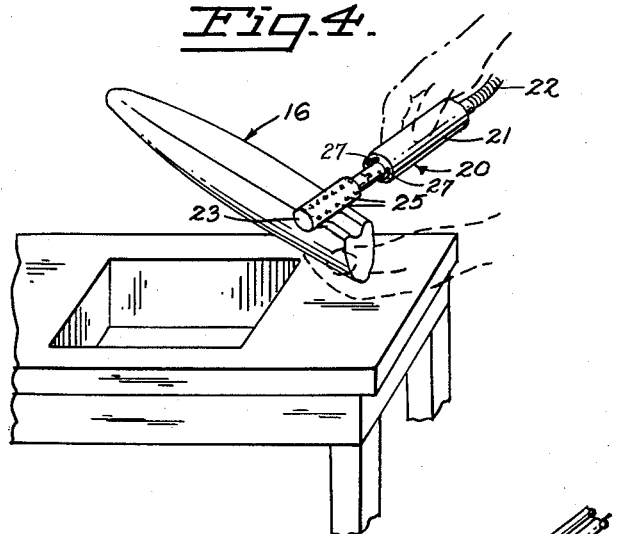
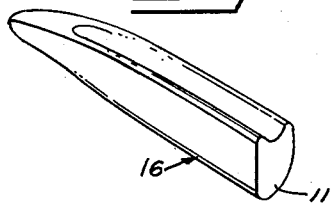
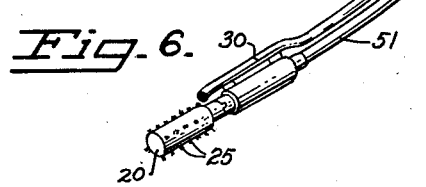
INVENTOR.
RAY JOHNSON
BY
ATTORNEY

United States Patent Office 2,911,668
Patented Nov. 10, 1959

2,911,668

METHOD FOR CLEANING FISH

Ray Johnson, San Diego, Calif., assignor to Van Camp Sea Food Company, Inc., San Pedro, Calif., a corporation of California Application November 19, 1956, Serial No. 623,091

6 Claims. (Cl. 17—45)

This invention relates to a method of cleaning cooked fish. More particularly, it relates to a method for cleaning from fish the outer layer of skin and in removing from fish such as tuna less valuable or objectionable darker portions or strata of the meat in a way that saves the removed parts for other uses and leaves the maximum amount of the most valuable light colored portions of the meat.

In cleaning such fish as tuna preparatory to canning them, certain problems have arisen in the separation of such portions as bloodmeat from the valuable light meat. In order to explain these problems a brief description of the commercial method of producing canned tuna will be helpful. After evisceration, the tuna is placed in baskets in wheeled racks and is cooked with low-pressure steam in special cookers. After the fish has been cooked and cooled to room temperature, it is worked on by cleaning women who separate the portions to be canned from the skin, head, bones, fins, bloodmeat, etc., which are usually further processed into fish meal. The portions canned are primarily loins from which all these other parts have been cleaned. They are machine-packed into cans with oil, salt, and possibly some other ingredients added, and the cans are then sealed. The present invention relates particularly to the cleaning operation.

The cleaning operation is still carried on as it has been for more than thirty years. Women using knives scrape and cut away the skin, bones, and bloodmeat from the loins. The process is costly because it involves cutting by skilled handworkers who must cut with great care. Moreover, it is wasteful because much good meat has been cut off in order to be sure not to leave any of the bloodmeat or other dark portions. As a result of cutting with the knife, only about 85% of the product that could be used if careful cleaning were observed actually remains available for use. In other words, about 15% of the best tuna is wasted by the present process.

One object of this invention is to provide a process for cleaning the fish after cooking, in which substantially all of the light meat loin portion is saved instead of only about 85%.

When using a knife in the cleaning operations, extreme care and skill has been required to prevent removing even more excessive parts of the good loin portions. Another object of the present invention is to provide a method which makes it possible to remove all the skin, bloodmeat, etc., while leaving substantially all the good loin lightmeat portion.

Another object of the invention is to provide a more rapid, more economical, and greatly improved method for cleaning pre-cooked fish.

Another object of the invention is to provide a method that results in obtaining shredded bloodmeat instead of slices, thereby saving in later processing of the by-product.

Another object is to give the cleaner increased visibility during the cleaning operation, thereby enabling more accurate and more rapid cleaning.

Broadly speaking, the method comprises shredding away the objectionable bloodmeat and other waste portions from the main body of the loin, leaving intact the most valuable part. Preferably, this shredding is followed by or accompanied simultaneously by blowing the shredded portions away from the loin and the operator so as to give the operator improved visibility and make it possible to see the loin clearly. Blowing also serves to remove the waste without having to provide separate steps in the operation or take up the time of the cleaner in having to sweep aside the shredded waste.

Other objects and advantages of the invention will appear from the following description of some preferred embodiments of this method.

In the drawings:

Fig. 1 is a view in side elevation of a fish, such as a tuna fish, of the type which is to be cleaned.

Figs. 1A, 1B, 1C, 1D, 1E, 1F, and 1G are, respectively, half-section views taken along the lines A—A, B—B, C—C, D—D, E—E, F—F, and G—G of Fig. 1 and showing one half of the fish and the irregular disposition of meat therein.

Fig. 2 is a view in perspective of a beheaded fish like that in Fig. 1, showing the principal areas of bone, loin, and bloodmeat. Fig. 2 is on a reduced scale as compared with Fig. 1.

Fig. 3 is a view in perspective, enlarged as regards Fig. 2, showing a pair of loins cut from the fish of Fig. 2 with the bloodmeat still on them.

Fig. 4 is a view in perspective showing the steps of shredding away the bloodmeat from the remainder of the loin.

Fig. 5 is a view in perspective of a cleaned loin from which the bloodmeat has been removed.

Fig. 6 is a view in perspective of a modified form of apparatus for performing the shredding-cleaning operation shown in Fig. 4.

The fish 10 shown in Fig. 1 illustrates further the problem and what the present invention accomplishes. Previously to the cleaning process with which this invention is concerned, the tuna 10 has already been eviscerated, cooked, and cooled to room temperatures. At this stage the fish is to be split into loins. It will be noted from the sections, partciularly Figs. 1C, 1D, 1E, and 1F, that there are two kinds of meat on the tuna. One is the valuable light meat 11, which may be almost white, and the other is the bloodmeat 12, which occurs in rather irregular pockets between portions of the light meat 11 along a line approximately perpendicular to the backbone 13. The problem is, how to remove the bloodmeat 12 and other dark meat and the skin, while leaving as much as possible of the light meat 11. As will be seen, the problem is complicated by the irregularity of disposition of the bloodmeat 12, which meant that when a knife blade was used to cut it off the material simply had to be cut off along the line x—x—x shown in Fig. 3, and a substantial amount of the light meat 11 would be removed along with the bloodmeat 12.

As Fig. 2 shows, the fish 10 is beheaded and the tail 14 is later taken off. The body 15 of the fish 10 may then be divided into four loin sections 16, each having an irregular section 12 of bloodmeat. Fig. 3 shows two of the loins which result from the division of the fish body 15 after removal of the bones. As will be noted, the loins 16 are defiled by a rather V-shaped irregular portion of bloodmeat 12 fitting in what may be considered a valley in the valuable light meat 11. Instead of cutting both the bloodmeat 12 and light meat portions 17 off with a knife along the line x—x, the present invention gets rid of the bloodmeat 12 by a novel process, namely by shredding it away.

In Fig. 4 the operator is using a tool 20 (like the one disclosed and claimed in co-pending application Serial No. 623,092 filed November 19, 1956), to shred away the dark meat 12 from the loin 16. The tool 20 may comprise an air motor 21 connected to an air conduit 22 and rotating a hob 23 comprising a cylinder of nylon with nylon bristles 25 projecting out radially along axially extending rows. The bristles 25 contact the meat and tear it away. Since the bristles are short, the result is tha the meat is shredded.

By shredding away the waste several things are accomplished. In the first place, the waste is separated from the light meat 11 very quickly, much quicker than by cutting. In the second place, the shredding is easily stopped by lifting the tool 20 as soon as any light meat is hit. That means that very little light meat 11 is wasted and that a resulting loin 16, cleaned from bloodmeat and skin, as shown in Fig. 5, is of a far different shape from that which would result by simply cutting off the material with a knife along the line x—x, which would be necessary in cutting to be sure to get rid of all the bloodmeat. In the third place, the shredding is continued along the loin progressively, to clean away all the waste quickly. A good eye with little skill can get excellent results without long practice, since the meat is shredded away by power means. In the fourth place, the shredded bloodmeat 12 can be collected and used without further processing as cat food, etc., shredded material being easy to work with. In the fifth place, it is easy to clean away the shredded material from the work area by blowing it away from the meat that is remaining. It may be blown by an axially directed current of air from the slots 27 in the air motor 21, that act as exhaust ports to blow the waste away in the direction away from the operator. This clears the field of vision and at the same time moves the shredded meat away from the loin.

Other shredding tools than the one shown may be used for the shredding, but a rotational shredder is preferable. Also, different methods of blowing may be used. Instead of the air flowing axially from the shredding tool directly from an air motor, the expedient shown in Fig. 6 may be used. There, the air is conducted in a separate tube 30 which does not even have to be connected to the cleaning tool 20 at all. In fact, the cleaning tool 20 may be rotated by a flexible shaft instead of an air motor. In any event, the air current is directed along over the tool 20 and away from the operator. In any event, the result is the removal of the material by shredding, as distinct from cutting, and the disposal of the material by blowing it away, as distinct from having to move it mechanically or by hand.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. The process of removing the bloodmeat from cooked fish in which the bloodmeat extends in longitudinal sections within the body of the fish which comprises separating the body of the fish into longitudinal sections to expose the bloodmeat, shredding the exposed bloodmeat and removing the shreds from the sections.

2. The process of removing the bloodmeat from cooked fish in which the bloodmeat extends in longitudinal sections within the body of the fish which comprises separating the body of the fish into longitudinal sections to expose the bloodmeat, shredding the exposed bloodmeat and blowing the shreds to remove them from the sections.

3. The process of removing the bloodmeat from cooked fish in which the bloodmeat extends in longitudinal sections within the body of the fish which comprises separating the body of the fish into longitudinal sections to expose the bloodmeat, rotationally shredding the exposed bloodmeat and removing the shreds so produced from the sections.

4. The process of removing the bloodmeat from cooked fish in which the bloodmeat extends in longitudinal sections within the body of the fish which comprises separating the body of the fish into longitudinal sections to expose the bloodmeat, rotationally shredding the exposed bloodmeat and blowing the shreds so produced to remove them from the sections.

5. The process of removing the bloodmeat from cooked fish in which the bloodmeat extends in longitudinal sections within the body of the fish which comprises separating the body of the fish into longitudinal sections to expose the bloodmeat, directing a rotational shredding device against the exposed bloodmeat and simultaneously blowing air against the device and shreds to remove them from the device and sections.

6. The process of removing the bloodmeat from cooked fish in which the bloodmeat extends in longitudinal sections within the body of the fish which comprises separating the body of the fish into longitudinal sections to expose the bloodmeat, rotationally shredding the exposed bloodmeat, and blowing the shreds so produced away from the sections in a direction parallel to the axis of rotation of the rotational shredding.

References Cited in the file of this patent

UNITED STATES PATENTS

| | | |
|---|---|---|
| 1,107,100 | Palmer | Aug. 11, 1914 |
| 1,119,104 | Mohr | Dec. 1, 1914 |
| 1,208,713 | Roland | Dec. 12, 1916 |
| 1,557,326 | Powell | Oct. 13, 1925 |
| 1,741,332 | Pearl | Dec. 31, 1929 |
| 2,245,329 | Danielsson | June 10, 1941 |
| 2,323,725 | O'Brien | July 6, 1943 |
| 2,565,727 | Henderson | Aug. 28, 1951 |
| 2,622,270 | Envoldsen | Dec. 23, 1952 |
| 2,763,461 | Hill | Sept. 18, 1956 |
| 2,808,225 | Johnson | Oct. 1, 1957 |